(12) United States Patent
Mori et al.

(10) Patent No.: US 11,511,702 B2
(45) Date of Patent: Nov. 29, 2022

(54) VEHICLE REMOTE CONTROL SYSTEM, VEHICLE REMOTE CONTROL METHOD, SERVER, TERMINAL DEVICE, AND COMMUNICATION DEVICE

(71) Applicant: HONDA MOTOR CO., LTD., Tokyo (JP)

(72) Inventors: Yotaro Mori, Wako (JP); Keisuke Kishikawa, Wako (JP); Kohei Noguchi, Wako (JP); Kenichi Ohira, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/383,534

(22) Filed: Jul. 23, 2021

(65) Prior Publication Data

US 2021/0347329 A1 Nov. 11, 2021

Related U.S. Application Data

(63) Continuation of application No. PCT/JP2019/003517, filed on Jan. 31, 2019.

(51) Int. Cl.
*B60R 25/10* (2013.01)
*B60R 25/102* (2013.01)
(Continued)

(52) U.S. Cl.
CPC ........ *B60R 25/1018* (2013.01); *B60R 25/102* (2013.01); *B60R 25/1003* (2013.01);
(Continued)

(58) Field of Classification Search
CPC ..... B60R 25/00; B60R 25/10; B60R 25/1003; B60R 25/1016; B60R 25/1018;
(Continued)

(56) References Cited

U.S. PATENT DOCUMENTS 6,005,478 A 12/1999 Boreham et al.
11,376,968 B2 * 7/2022 Park .................. B60L 53/66
(Continued)

FOREIGN PATENT DOCUMENTS

JP   9-508979 A    9/1997
JP   2008-097138 A  4/2008
(Continued)

OTHER PUBLICATIONS

NPL Search.*
(Continued)

*Primary Examiner* — Van T Trieu
(74) *Attorney, Agent, or Firm* — WHDA, LLP

(57) ABSTRACT

A vehicle remote control system includes a vehicle and a server configured to remote-control the vehicle via a communication device. The communication device comprises: an acquisition unit configured to acquire control information representing a control state of the vehicle from a control device configured to control the vehicle and voltage information from a power supply device configured to supply power to the vehicle; a transmission unit configured to transmit the control information and the voltage information to the server; a warning unit configured to, if the voltage information cannot be acquired, transmit a warning for notifying an abnormality of the vehicle to the server; and a processing suppression unit configured to, if the vehicle is in a maintenance state, suppress processing of the warning unit such that the warning is not transmitted.

40 Claims, 7 Drawing Sheets

(51) Int. Cl.
    *G05D 1/00*       (2006.01)
    *H04W 4/021*    (2018.01)
    *B60R 25/33*     (2013.01)

(52) U.S. Cl.
    CPC .......... *G05D 1/0016* (2013.01); *H04W 4/021* (2013.01); *B60R 25/33* (2013.01); *B60R 2325/205* (2013.01)

(58) Field of Classification Search
    CPC ..... B60R 25/102; B60R 25/104; B60R 25/33; G05D 1/00; G05D 1/0016; H04W 4/021; H04W 4/104; B60L 50/50; B60L 53/126; B60L 53/66
    See application file for complete search history.

(56) References Cited

U.S. PATENT DOCUMENTS

| | | | | |
|---|---|---|---|---|
| 2015/0127203 | A1* | 5/2015 | Kashiba | ................ B60W 10/24 701/22 |
| 2020/0369238 | A1 | 11/2020 | Toyooka et al. | |
| 2022/0232360 | A1* | 7/2022 | Wei | ................... H04M 1/72436 |

FOREIGN PATENT DOCUMENTS

| | | |
|---|---|---|
| JP | 2012-222945 A | 11/2012 |
| JP | 6238038 B1 | 11/2017 |

OTHER PUBLICATIONS

International Search Report dated Apr. 9, 2019, issued in counterpart application No. PCT/JP2019/003517, w/English translation (4 pages).

Written Opinion dated Apr. 9, 2019, issued in counterpart application No. PCT/JP2019/003517 (4 pages).

* cited by examiner

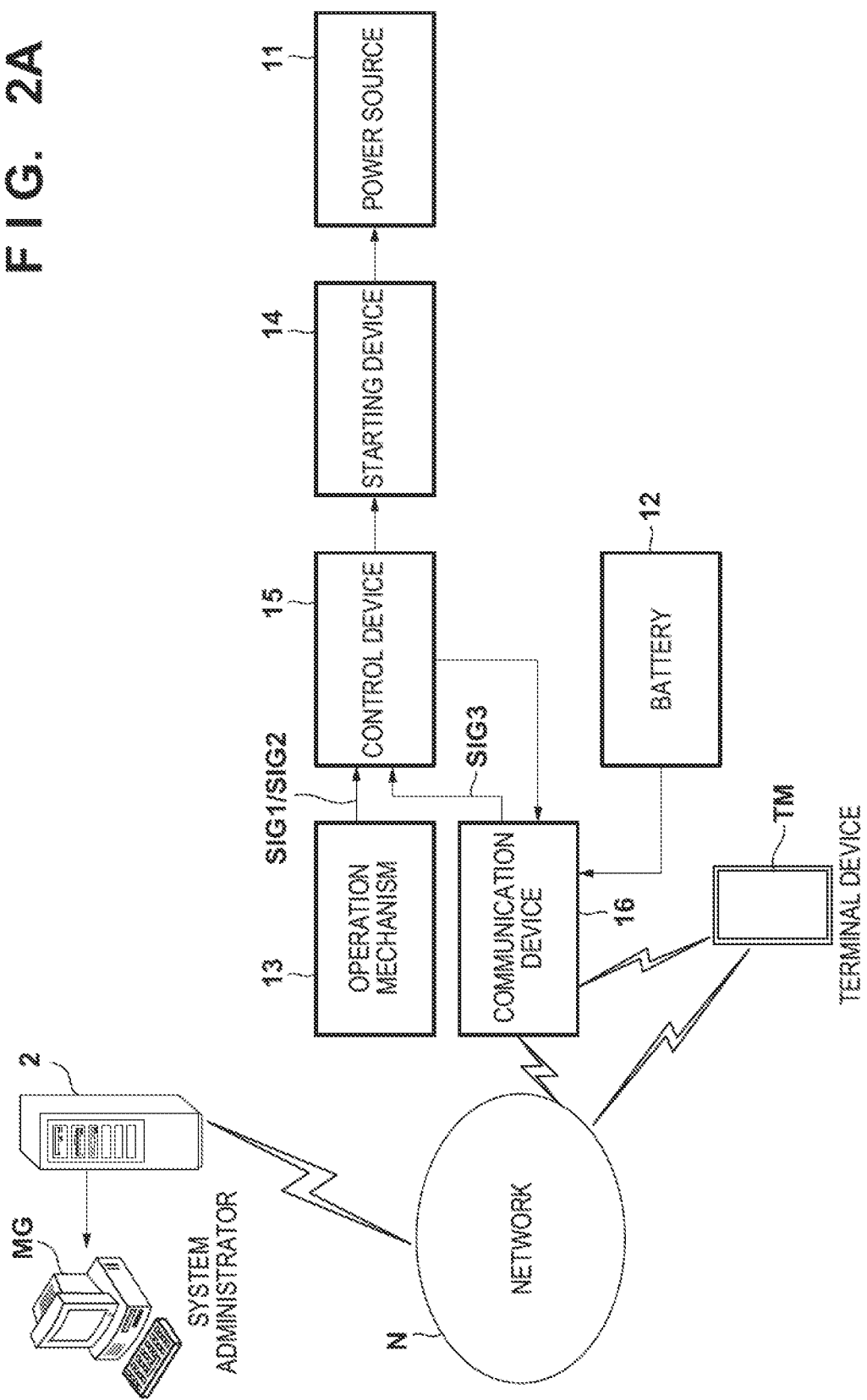

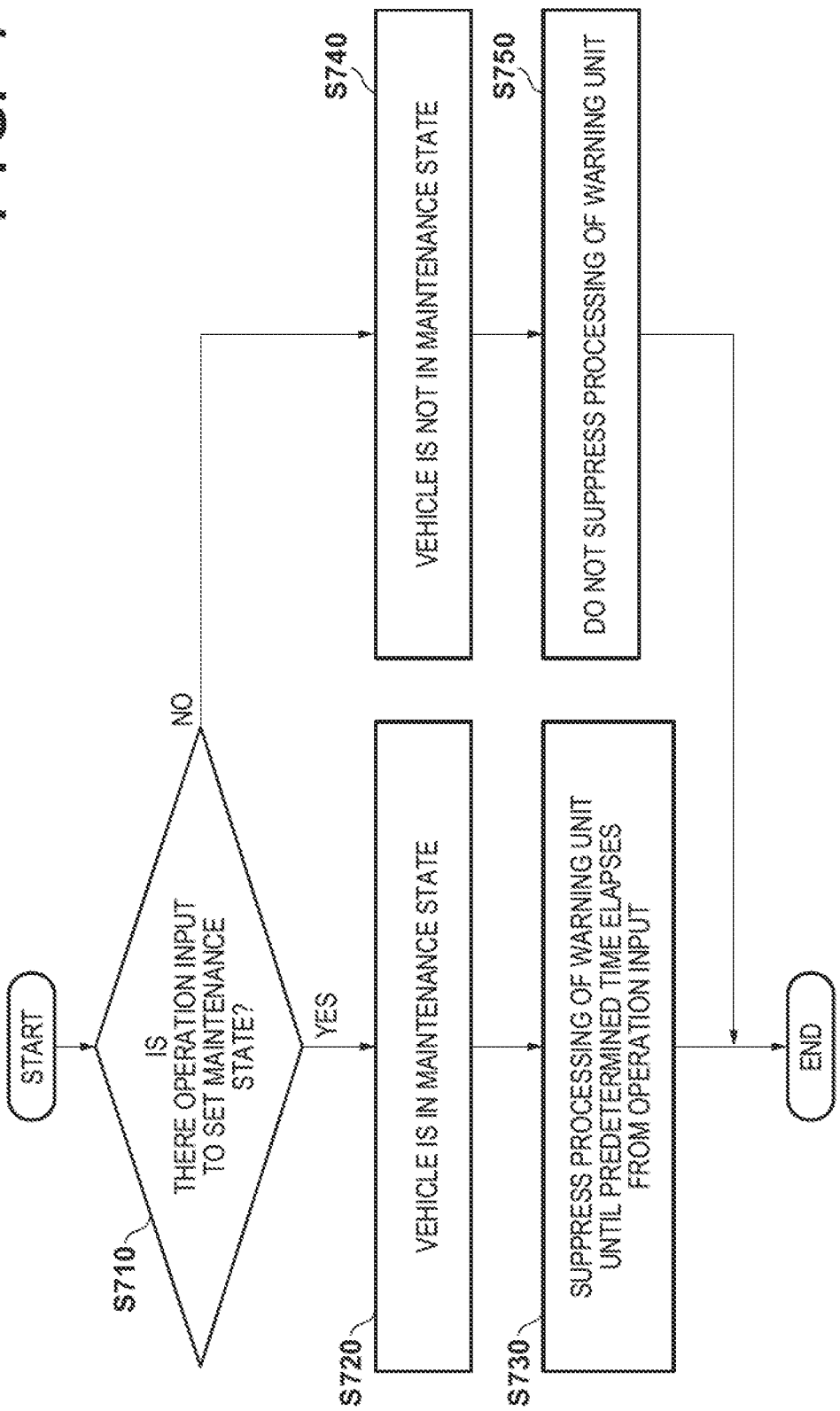

VEHICLE REMOTE CONTROL SYSTEM, VEHICLE REMOTE CONTROL METHOD, SERVER, TERMINAL DEVICE, AND COMMUNICATION DEVICE

CROSS-REFERENCE TO RELATED APPLICATION(S)

This application is a continuation of International Patent Application No. PCT/JP2019/003517 filed on Jan. 31, 2019, the entire disclosures of which is incorporated herein by reference.

BACKGROUND OF THE INVENTION

Field of the Invention

The present invention relates to a vehicle remote control system, a vehicle remote control method, a server, a terminal device, and a communication device.

Description of the Related Art

As an apparatus mounted in a vehicle, PTL 1 discloses, for example, a vehicle remote control system configured to, if an abnormality of a vehicle such as detachment of a wire to a battery is detected, output a warning to a server and set the vehicle in an activation disabled state by remote control.

CITATION LIST

Patent Literature

PTL 1: Japanese Patent No. 6238038

SUMMARY OF THE INVENTION

In the configuration of PTL 1, however, it is impossible to discriminate between a case in which the wire is detached by a theft or the like and a case in which the wire is intentionally detached by a normal maintenance work such as battery exchange. For this reason, even if the wire is intentionally detached in the normal maintenance work, and voltage information of the battery cannot be acquired, a warning may be transmitted to the server upon judging the state as a vehicle abnormality, and the vehicle may be set in a state in which it cannot be activated based on remote control of the server.

The present invention has been made in consideration of the above-described problem and provides a technique capable of suppressing transmission of a warning if a vehicle is in a maintenance state even if the voltage information of a power supply device cannot be acquired.

A vehicle remote control system according to an aspect of the present invention is a vehicle remote control system including a vehicle and a server configured to remote-control the vehicle via a communication device, wherein the communication device comprises:
an acquisition unit configured to acquire control information representing a control state of the vehicle from a control device configured to control the vehicle and voltage information from a power supply device configured to supply power to the vehicle;
a transmission unit configured to transmit the control information and the voltage information to the server;
a warning unit configured to, if the voltage information cannot be acquired, transmit a warning for notifying an abnormality of the vehicle to the server; and
a processing suppression unit configured to, if the vehicle is in a maintenance state, suppress processing of the warning unit such that the warning is not transmitted, and
the server comprises:
a reception unit configured to receive the warning for notifying the abnormality of the vehicle;
a generation unit configured to generate a control signal for remote-controlling the vehicle based on the warning received by the reception unit; and
a transmission unit configured to transmit the control signal generated by the generation unit to the communication device.

A vehicle remote control method according to another aspect of the present invention is a vehicle remote control method in a vehicle remote control system including a vehicle and a server configured to remote-control the vehicle via a communication device, comprising:
an acquisition step of acquiring control information representing a control state of the vehicle from a control device configured to control the vehicle and voltage information from a power supply device configured to supply power to the vehicle;
a transmission step of transmitting the control information and the voltage information to the server;
a warning step of, if the voltage information cannot be acquired, transmitting a warning for notifying an abnormality of the vehicle to the server;
a processing suppression step of, if the vehicle is in a maintenance state, suppressing processing of the warning step such that the warning is not transmitted;
a reception step of receiving the warning for notifying the abnormality of the vehicle;
a generation step of generating a control signal for remote-controlling the vehicle based on the warning received in the reception step; and
a transmission step of transmitting the control signal generated in the generation step to the communication device.

A server according to still another aspect of the present invention is a server configured to remote-control a vehicle via a communication device including a warning unit configured to, if voltage information cannot be acquired from a power supply device configured to supply power, transmit a warning for notifying an abnormality, and a processing suppression unit configured to, if the vehicle is in a maintenance state, suppress processing of the warning unit such that the warning is not transmitted, the server comprising:
a reception unit configured to receive the warning for notifying the abnormality of the vehicle;
a generation unit configured to generate a control signal for remote-controlling the vehicle based on the warning received by the reception unit; and
a transmission unit configured to transmit the control signal generated by the generation unit to the communication device.

A terminal device according to still another aspect of the present invention is a terminal device configured to, if voltage information cannot be acquired from a power supply device configured to supply power, set a vehicle in a maintenance state to suppress transmission of a warning for notifying an abnormality of the vehicle, the terminal device comprising:

an operation unit configured to set a state of the vehicle to the maintenance state during a time until a predetermined time elapses;

an extension operation unit configured to extend the time until the predetermined time elapses; and an extended time setting unit configured to set an extended time to extend the time based on a time input by a user operation.

A communication device according to still another aspect of the present invention is a communication device comprising:

an acquisition unit configured to acquire control information representing a control state of a vehicle from a control device configured to control the vehicle and voltage information from a power supply device configured to supply power to the vehicle;

a transmission unit configured to transmit the control information and the voltage information to a server;

a warning unit configured to, if the voltage information cannot be acquired, transmit a warning for notifying an abnormality of the vehicle to the server; and a processing suppression unit configured to, if the vehicle is in a maintenance state, suppress processing of the warning unit such that the warning is not transmitted.

According to the present invention, it is possible to suppress transmission of a warning if a vehicle is in a maintenance state even if the voltage information of a power supply device cannot be acquired. Accordingly, if the vehicle is in the maintenance state, the user can perform a maintenance work without issuance of a warning.

Further features of the present invention will become apparent from the following description of exemplary embodiments (with reference to the attached drawings).

BRIEF DESCRIPTION OF THE DRAWINGS

The accompanying drawings showing the embodiments of the present invention constitute a part of the specification and, together with the description, serve to explain the present invention.

FIG. 2A is a block diagram for explaining an example of a vehicle configuration for controlling a power source;

FIG. 7 is a flowchart for explaining the procedure of processing by a TCU (a warning unit, a state determination unit, and a processing suppression unit).

DESCRIPTION OF THE EMBODIMENTS

Figure 1:
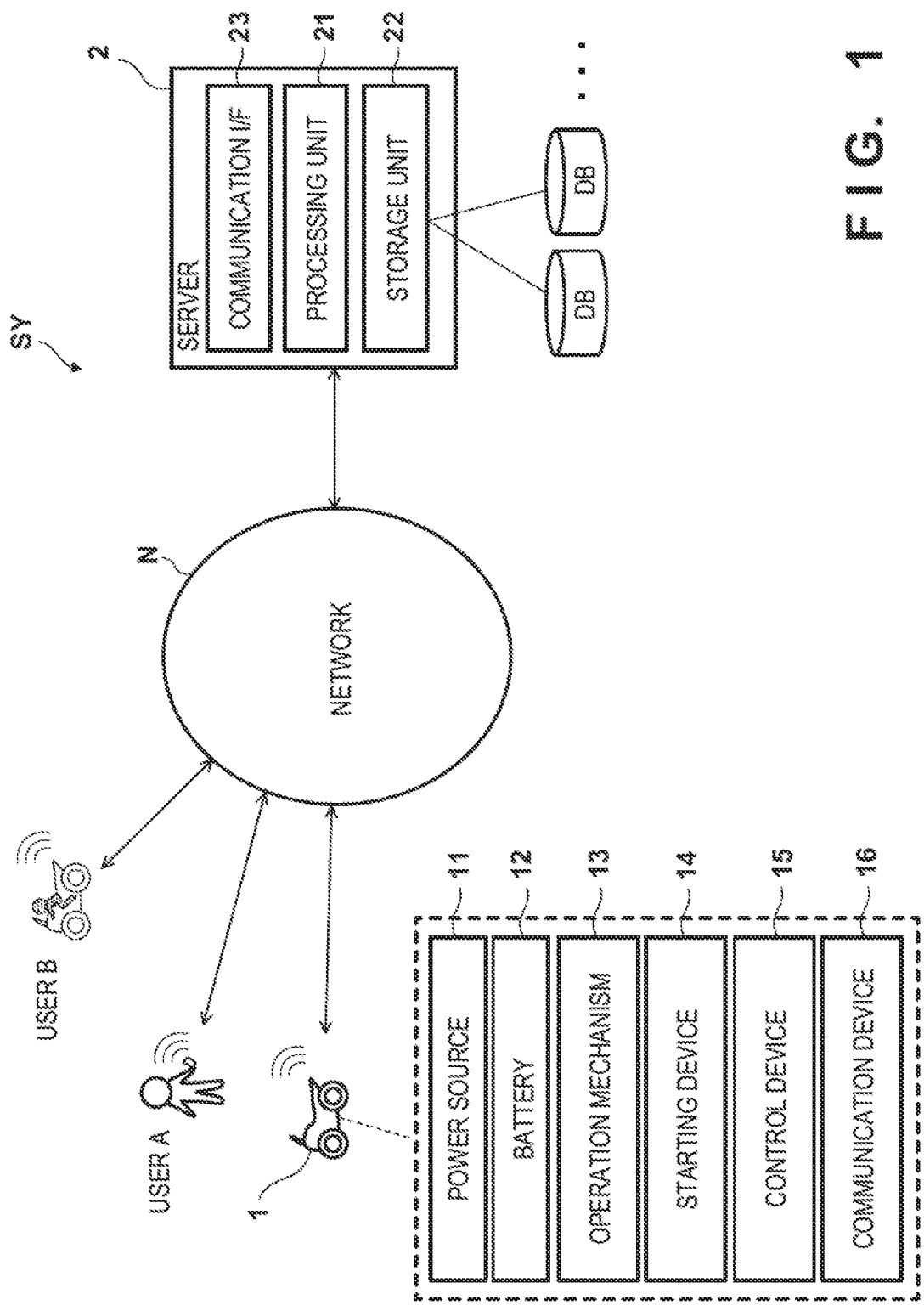
FIG. 1 is a block diagram for explaining an example of a vehicle remote control system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a view showing an example of the configuration of a vehicle remote control system SY (vehicle use service system) according to the first embodiment. The vehicle remote control system SY includes one or more vehicles 1, and a server 2 of a management company, which can communicate with that via a network N. The server 2 communicates with the vehicle 1 via the network N and outputs a signal for remote-controlling the vehicle 1.

The vehicle 1 is, for example, a straddle type vehicle in this embodiment but may be a riding type vehicle. Note that the straddle type vehicle indicates a type that a driver rides while straddling the vehicle body, and the concept includes not only a typical motorcycle (including a scooter-type vehicle) but also a three-wheeled vehicle (a vehicle with one front wheel and two rear wheels or a vehicle with two front wheels and one rear wheel), and an all terrain vehicle (ATV) such as a four-wheeled buggy.

The vehicle 1 includes a power source 11, a battery 12 (power supply device) that supplies power to the vehicle, an operation mechanism 13, a starting device 14, a control device 15 that controls the vehicle, and a communication device 16. In this embodiment, the power source 11 is an internal combustion engine (engine). However, as another embodiment, an electric motor such as a three-phase induction motor may be used as the power source 11. The battery 12 can supply power to each element of the vehicle 1. A secondary battery that can be charged based on the power of the power source 11 is used as the battery 12. Examples are a lead storage battery, a lithium ion battery, and a nickel hydrogen battery.

The operation mechanism 13 is configured to be able to input an operation for controlling the power source 11 and, for example, outputs a predetermined control signal to the control device 15 (to be described later) based on an operation input by the user A. Examples of the operation input to the operation mechanism 13 are a rotating operation using a predetermined key (an ignition key, a remote key, or the like) corresponding to the vehicle 1, and a pressing operation using a press type switch (a start switch, or the like).

Based on the operation input to the operation mechanism 13, the starting device 14 can start the power source 11 and set it in an operation state, and can also stop the power source 11 in the operation state. For the starting device 14, a known ignition device including an igniter and the like is used.

The control device 15 is an ECU (Electronic Control Unit) capable of performing operation control of the entire vehicle 1, and can, for example, transmit/receive signals to/from each constituent element of the vehicle 1 via predetermined signal lines. As an example, the control device 15 can receive a control signal according to an operation input to the operation mechanism 13 and control to cause the starting device 14 to start the power source 11.

The functions of the control device 15 can be implemented by either hardware or software. For example, the functions of the control device 15 may be implemented by executing a predetermined program by a CPU (Central Processing Unit) using a memory. Alternatively, the functions of the control device 15 may be implemented by a known semiconductor device such as a PLD (Programmable Logic Device) or an ASIC (Application Specific Integrated Circuit). The control device 15 is shown here as a single element. However, the control device 15 may be divided into two or more elements as needed.

The communication device 16 includes an antenna configured to implement communication with the server 2 via the network N, and includes a TCU (Telematics Control Unit) that performs signal processing for performing communication with the server 2 via the network N. The TCU can acquire, from the battery 12, voltage information representing the voltage value of the battery 12. Also, the TCU can acquire from the control device 15 (ECU), control information representing the control state of the vehicle 1. The TCU transmits the acquired voltage information of the battery 12 and the control information of the control device 15 (ECU) to the server 2 via the network N. In addition, the TCU can intervene in vehicle control by the control device 15 based on the information received from the server 2 and control the control device 15 to restrict the functions of the vehicle 1. Details of the processing of the TCU will be described later.

The server 2 that remote-controls the vehicle 1 includes a processing unit 21, a storage unit 22, and a communication interface unit 23 (communication I/F) and is installed in, for example, a management company that provides a vehicle use service. The processing unit 21 is formed by a processor including a CPU and a memory, and the storage unit 22 is formed by a RAM serving as the processing area of a program, a ROM that stores various programs and data, and an HDD (Hard Disk Drive) having a relatively large capacity. In addition, the storage unit 22 may be distributedly arranged on a cloud.

For example, the processing unit 21 can communicate with the vehicle 1 by the communication interface unit 23 via the network N, store information about the vehicle 1 in the storage unit 22, or read out the information about the vehicle 1 from the storage unit 22. The processing unit 21 can also communicate with the terminal device (a portable terminal device such as a smartphone) of a user A of the vehicle 1, store information about the user A in the storage unit 22, or read out the information about the user A from the storage unit 22. The information about the vehicle 1 and the information about the user A are associated with each other to form a database DB concerning the vehicle 1 and the user A. Similarly, the database DB is also formed even for each of another user B during driving and other users (not shown).

In the vehicle remote control system SY (vehicle remote control system), the server 2 of the management company can communicate with the vehicle 1, the user A, and the like and perform predetermined management. Examples of the vehicle use service are a vehicle sales service and a vehicle rental service, and examples of the management by the management company are permission of use of the vehicle 1 for a user and restriction of the functions of the vehicle 1.

The communication interface unit 23 of the server 2 receives a warning that is transmitted from the communication device 16 of the vehicle 1 and configured to notify an abnormality of the vehicle 1. The processing unit 21 generates a control signal for remote-controlling the vehicle 1 based on the received warning. Also, the communication interface unit 23 transmits the generated control signal to the vehicle (for example, the communication device 16 of the vehicle 1). The communication device 16 of the vehicle 1 outputs the information (control signal) received from the server 2 to the control device 15. Based on the information (control signal) acquired from the communication device 16, the control device 15 controls the vehicle 1 to restrict the functions of the vehicle 1. For example, if vehicle sales based on a loan contract is made between the management company and the user A, the server 2 of the management company can permit the user A to use the vehicle 1 when appropriate payment by the user A is being done, and restrict use (restrict the functions of the vehicle 1) if payment delays. As an example, the server 2 manages the state of payment by the user A on the database DB. If payment delays, as a signal (function restriction signal) for requesting function restriction of the vehicle 1, the server 2 transmits, for example, a signal for requesting to restrict starting of the power source 11 to the vehicle 1 of the user A. In the vehicle 1, in accordance with the reception of the signal from the server 2 by the communication device 16, the control device 15 can suppress starting of the power source 11 by the starting device 14.

FIG. 2A is a block diagram for explaining an example of a vehicle configuration for controlling the power source 11. The control device 15 receives signals from the operation mechanism 13 and the communication device 16 and controls (starts/stops) the power source 11 by the starting device 14 based on the signals.

The operation mechanism 13 can selectively output a starting signal SIG1 and a stop signal SIG2 as control signals for controlling the power source 11. The starting signal SIG1 is a control signal for starting the power source 11 in a stop state. The stop signal SIG2 is a signal for stopping the power source 11 in an operation state. For example, if an operation of instructing to start the power source 11 is input to the operation mechanism 13, the operation mechanism 13 outputs the starting signal SIG1 to the control device 15. For example, if an operation of instructing to stop the power source 11 is input to the operation mechanism 13, the operation mechanism 13 outputs the stop signal SIG2 to the control device 15.

The communication device 16 can communicate with the server 2 via the network N. Upon receiving a warning from the communication device 16 (TCU), the server 2 generates the starting restriction signal SIG3 as a control signal for restricting starting of the power source 11 based on the starting signal SIG1, and transmits the starting restriction signal SIG3 to the communication device 16 (TCU). The communication device 16 outputs the starting restriction signal SIG3 received from the server 2 to the control device 15 as a control signal for controlling the power source 11.

In addition, the TCU of the communication device 16 can acquire, from the battery 12, voltage information representing the voltage value of the battery 12. Also, the TCU can acquire, from the control device 15, control information representing the control state of the vehicle 1. The TCU transmits the acquired voltage information of the battery 12 and the control information of the control device 15 to the server 2 via the network N.

Figure 2B:
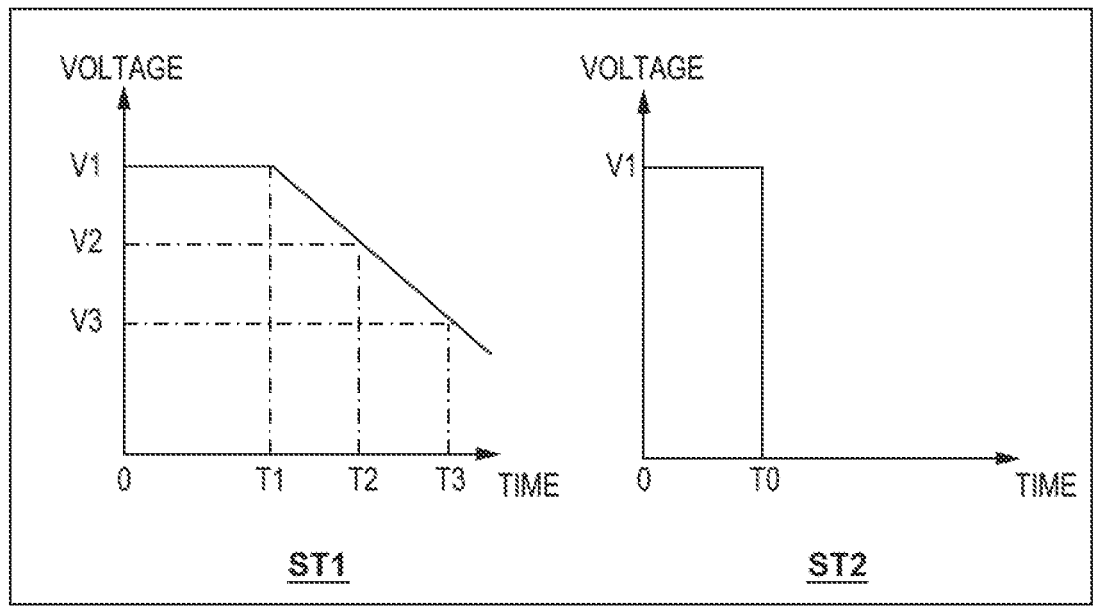
FIG. 2B is a view showing an example of detection of the voltage value of a battery.

FIG. 2B is a view showing an example of detection (acquisition) of the voltage value of the battery 12. ST1 in FIG. 2B shows a state in which the voltage value exhibits a tendency of lowering along with the elapse of time. In the initial state (time 0 to T1) of the battery 12, the voltage value is constant at V1. After the elapse of time T1, the voltage value exhibits a tendency of lowering as the time elapses. When a voltage value V2 (time T2) at which the starting performance of the power source 11 (engine) lowers is detected, the TCU transmits voltage information including a notification for calling attention to the server 2. When the voltage further lowers from the voltage value V2, and a voltage value V3 (time T3) at which the function of the TCU lowers is detected, the TCU transmits voltage information including a notification (warning) for giving a warning to the server 2.

Upon receiving the notification (warning) for giving a warning from the TCU, the server 2 registers the user as a user who does not deal with maintenance in the database (DB) of the server 2 and manages the information of the user. In addition, upon receiving information from the communication device 16 (TCU), the server 2 distributes the information to a system administrator TG and a terminal device TM of the user of the vehicle 1. The notification for calling attention and the notification (warning) for giving a warning are distributed stepwise to the terminal device TM of the user concerning the maintenance work such as exchange of the battery 12.

ST2 in FIG. 2B is a view showing an example of detection (acquisition) of voltage information in a case in which the wire of the battery 12 is detached or disconnected. In the state of ST2, the voltage value V1 is constant from time 0 to T0. However, the voltage is zero after time T0. Based on only the detection result of the voltage value, it is impossible to discriminate between a case in which the wire is detached by a theft or the like and a case in which the wire is intentionally detached by a normal maintenance work such as battery exchange. In this embodiment, a configuration will be described in which it is determined, by the processing of a state determination unit 320 to be described later, whether the vehicle 1 is in the maintenance state, and if the vehicle 1 is in the maintenance state, transmission of a warning is suppressed.

The control device 15 can control the power source 11 based on the starting signal SIG1, the stop signal SIG2, or the starting restriction signal SIG3. For example, before reception of the starting restriction signal SIG3, the control device 15 starts the power source 11 in accordance with reception of the starting signal SIG1, and stops the power source 11 in accordance with reception of the stop signal SIG2. Once the starting restriction signal SIG3 is received, the control device 15 does not start the power source 11 even if the starting signal SIG1 is received. Also, if the power source 11 is in the operation state, the control device 15 does not stop the power source 11 in the operation state even if the starting restriction signal SIG3 is received, and maintains the power source 11 in the operation state until the stop signal SIG2 is received.

(Functional Configuration of TCU)

Figure 3:
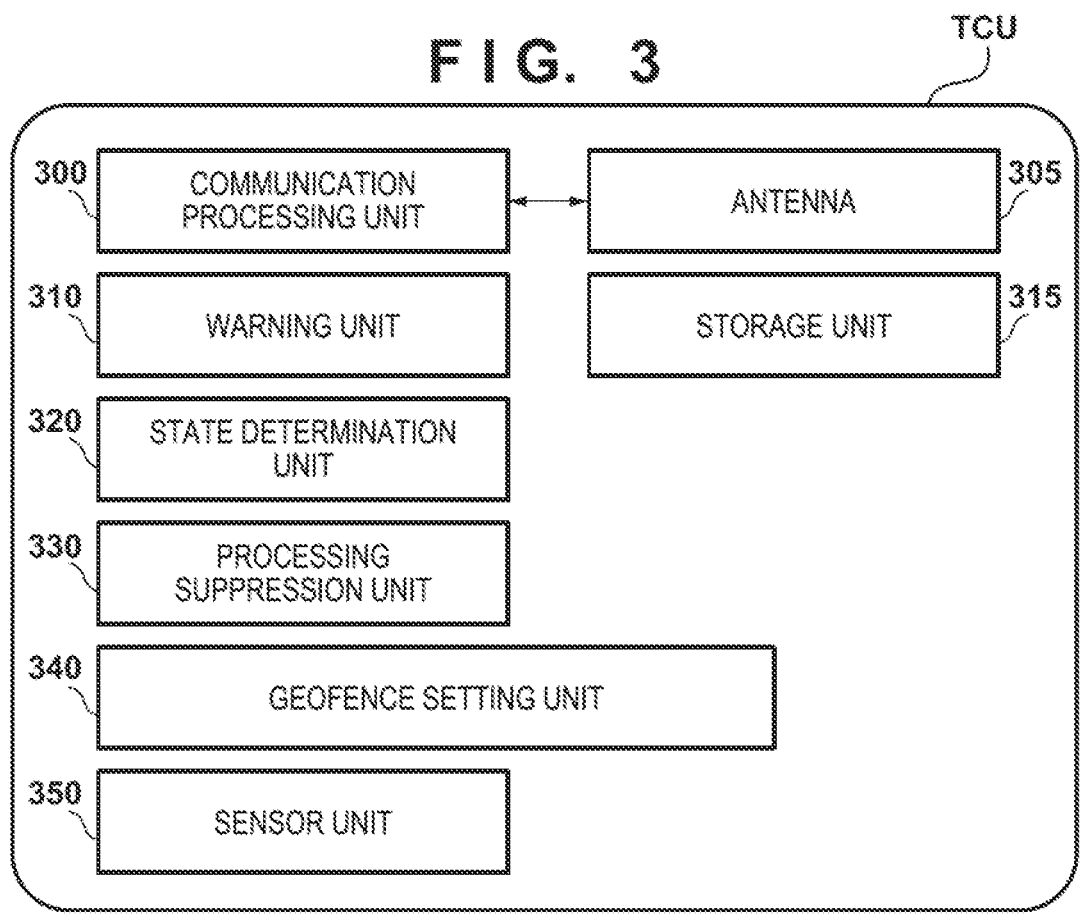
FIG. 3 is a block diagram for explaining the functional configuration of the TCU of a communication device.

FIG. 3 is a block diagram for explaining the functional configuration of the TCU of the communication device 16. An antenna 305 implements communication with the server 2 via the network N, and a communication processing unit 300 performs signal processing for performing communication with the server 2. The communication processing unit 300 can also perform signal processing for acquiring control information representing the control state of the vehicle 1 from the control device 15 and voltage information from the battery 12 (power supply device) and transmitting these to the server 2. In addition, the communication processing unit 300 performs signal processing for transmitting, to the server 2, a warning by a warning unit 310 to be described below.

If the voltage information of the battery 12 cannot be acquired, the warning unit 310 transmits a warning for notifying the abnormality of the vehicle 1 to the server 2. The transmission of the warning to the server 2 is performed via the communication processing unit 300.

The state determination unit 320 determines whether the vehicle 1 is in the maintenance state. Whether the vehicle is in the maintenance state can be determined by, for example, determining, based on the position information of the vehicle 1, whether the vehicle 1 is located in a region (geofence) where maintenance is permitted, or based on the presence/absence of an operation input for setting the state of the vehicle 1 to the above-described from the terminal device of the user.

The state determination unit 320 can also determine whether the vehicle 1 is in the maintenance state, using the position information of the vehicle 1 and the control information that the communication processing unit 300 acquires from the control device 15 (ECU). A detailed example of the processing of the state determination unit 320 will be described later.

If the vehicle 1 is in the maintenance state, the processing suppression unit 330 suppresses processing of the warning unit 310 such that a warning is not transmitted. That is, if the state determination unit 320 determines that the vehicle 1 is in the maintenance state, the processing suppression unit 330 suppresses the processing of the warning unit 310 such that a warning is not transmitted. A geofence setting unit 340 sets a region (geofence) where maintenance is permitted on map information.

The sensor unit 350 has the function of a position detection unit configured to detect the current position of the vehicle 1, receives a GPS satellite signal by a GPS sensor, and measures the current position (a latitude and a longitude) of the vehicle 1. Note that the sensor unit 350 need not always be provided in the contents of the TCU and may be provided in the vehicle 1. The sensor unit 350 may be provided in both the TCU and the vehicle 1, and the state determination unit 320 may compare the information of the current positions (latitudes and longitudes) obtained by the sensor units 350 and compare the relative distances of these.

(Setting of Geofence)

In this embodiment, as a configuration for suppressing the processing of the warning unit 310, an example based on the result of determining whether the position information of the vehicle 1 is located in a region (geofence) where maintenance is permitted will be described. In this embodiment, the state determination unit 320 determines, based on the position information of the vehicle 1, whether the vehicle 1 is in the maintenance state.

The region where maintenance is permitted includes, for example, a dealer that sells or maintains the vehicle 1, the home of the user of the vehicle 1, and the like. The information of the region where maintenance is permitted can be downloaded by communication with the server 2 and stored in a storage unit 315. For example, based on the position information (the latitude and the longitude) of a dealer, a region within the range of a predetermined radius can be stored in the storage unit 315 as the region (geofence) where maintenance is possible.

Figure 4:
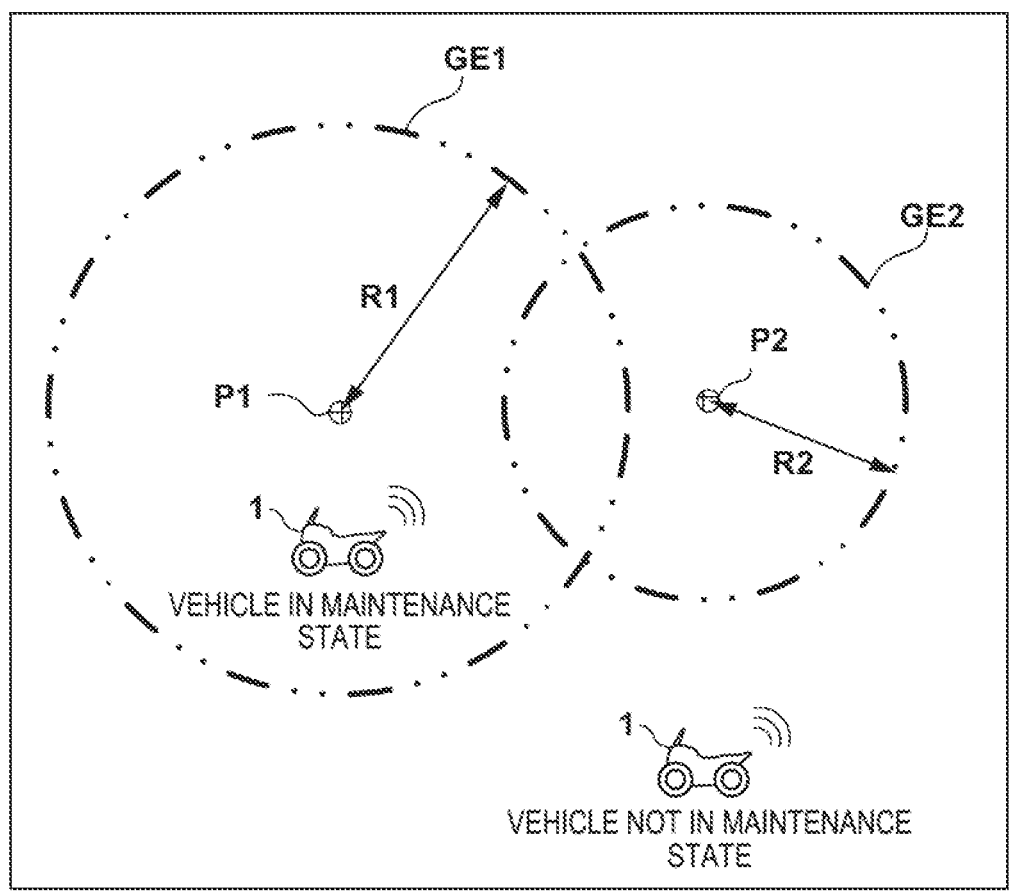
FIG. 4 is a view showing a setting example of a geofence.

FIG. 4 is a view showing a setting example of a geofence. For example, if a dealer performs a maintenance work, based on the position information of a designated maintenance base P1 (dealer), the geofence setting unit 340 can set an area (radius R1) within a predetermined range as a region GE1 (geofence) where maintenance is permitted. Alternatively, if the user performs the maintenance work at home, based on the position information of a designated maintenance base P2 (user's home), the geofence setting unit 340 can set an area (radius R2) within a predetermined range as a region GE2 (geofence) where maintenance is permitted. The radii R1 and R2 used to set the region (geofence) where maintenance is permitted may be identical, or the settings may be changed in accordance with the attributes of the bases P1 and P2 (for example, whether a dealer or user's home).

The base of maintenance can be designated by the terminal device of the dealer or the user, and the geofence setting unit 340 sets a geofence with respect to each designated base as the center. Also, if a plurality of bases are designated as the base of a maintenance work, the geofence setting unit 340 can also set, as a combined geofence, a region formed by combining the region GE1 (geofence) and the region GE2 (geofence) with respect to each designed base as the center. Note that although FIG. 4 shows an example in which the shape of a geofence is set by a circle, the geofence setting unit 340 can also set the shape of a geofence by a rectangle.

(Processing of TCU)

Figure 5:
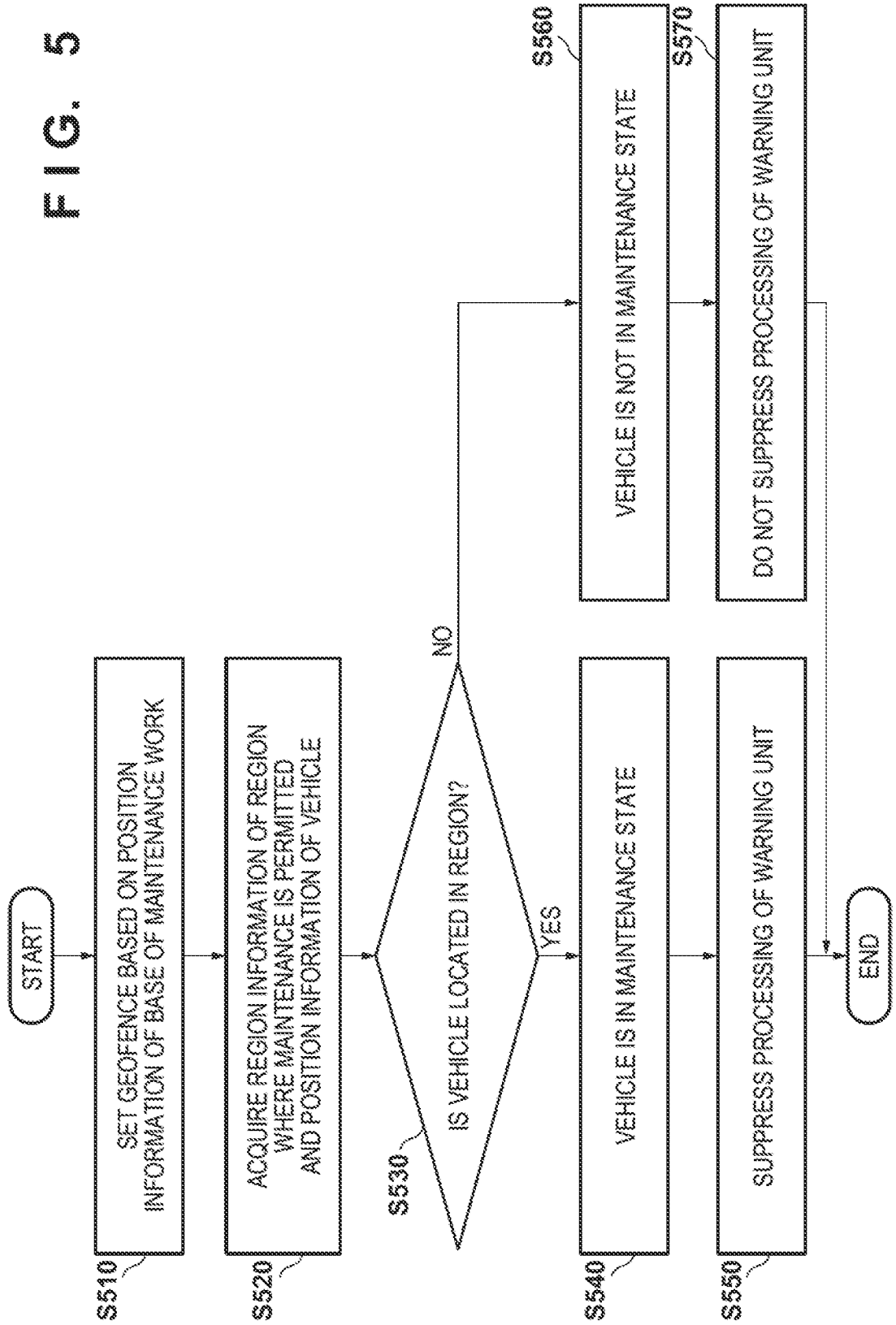
FIG. 5 is a flowchart for explaining the procedure of processing by the TCU (a warning unit, a state determination unit, and a processing suppression unit)

FIG. 5 is a flowchart for explaining the procedure of processing by the TCU (the warning unit 310, the state determination unit 320, and the processing suppression unit 330). First, in step S510, the geofence setting unit 340 sets s geofence based on the position information (the latitude and the longitude) of a designated base of a maintenance work. If a plurality of regions where maintenance is permitted are stored in the storage unit 315, at least one of the regions can be designated as the base of maintenance. Note that information about the base of maintenance can be added or changed based on information from the server 2.

In step S520, the state determination unit 320 acquires the region information of the region where maintenance is permitted and the position information (the latitude and the longitude) of the vehicle 1. Here, the position information (the latitude and the longitude) of the vehicle 1 is based on the detection result of the sensor unit 350, and the state determination unit 320 acquires the position information of the vehicle 1 from the sensor unit 350.

In addition, the region information of the region (geofence) where maintenance is permitted includes the position information (the latitude and the longitude) of the maintenance work base designated in step S510 and the information of a radius R used to set a predetermined range with respect to the position information as the center. If the geofence is set by a rectangle, the region information includes the position information (the latitude and the longitude) of the base and the information of the lengths of sides that form the rectangle.

In step S530, the state determination unit 320 compares the region information of the region (geofence) with the position information (the latitude and the longitude) of the vehicle 1, and determines whether the vehicle 1 is located in the region (geofence) where maintenance is permitted.

If the vehicle 1 is not located in the region in the determination processing of step S530 (NO in step S530), in step S560, the state determination unit 320 determines that the vehicle 1 is not in the maintenance state.

Then, in step S570, the processing suppression unit 330 does not suppress the processing of the warning unit 310. In this case, if voltage information cannot be acquired from the battery 12 (power supply device), it is determined that the vehicle 1 has an abnormality, and the warning unit 310 transmits a warning for notifying the abnormality of the vehicle 1 to the server 2.

On the other hand, if the vehicle 1 is located in the region (geofence) in the determination processing of step S530 (YES in step S530), in step S540, the state determination unit 320 determines that the vehicle 1 is in the maintenance state.

Note that if the TCU and the battery 12 can be detached as a maintenance work in the region (geofence), a form of a theft (vehicle abnormality) can also be considered in which the TCU and a nongenuine battery are left in a connected state, and the vehicle 1 is taken away. In this case, in the region (geofence), the state determination unit 320 can determine that the vehicle 1 is in the maintenance state on condition that the state determination unit 320 can further acquire the control information of the control device 15 (ECU).

That is, the state determination unit 320 can acquire the region information of the region where maintenance is permitted and the position information of the vehicle 1, and determine that the vehicle 1 is in the maintenance state if the vehicle 1 is located in the region, and the control information can be acquired.

The determination processing of the state determination unit 320 may be based on comparison between the position information and the region information of the region (geofence), or a condition that the control information of the control device 15 (ECU) can be acquired may be combined.

Then, in step S550, the processing suppression unit 330 suppresses the processing of the warning unit 310 such that a warning is not transmitted. In this case, even if voltage information from the battery 12 (power supply device) or control information from the control device 15 cannot be acquired, it is not determined that the vehicle 1 has an abnormality, and the processing suppression unit 330 suppresses the processing of the warning unit 310 such that a warning is not transmitted.

Note that the state determination unit 320 can determine whether a maintenance work is normal. For example, if voltage information acquired from the battery 12 (power supply device) after the end of maintenance is equal to or less than a voltage value serving as a reference, the state determination unit 320 determines that the maintenance work is not normal, and the warning unit 310 transmits a warning to the server 2 even if the vehicle 1 is located in the region (geofence).

For example, if the battery is exchanged with the genuine battery 12, the initial voltage value is the voltage value V1, as shown in ST1 of FIG. 2B. However, after the exchange of the battery, if, for example, the initial voltage value is the voltage value V2 lower than the voltage value V1, the battery may have been exchanged with a nongenuine battery. In this case, the state determination unit 320 determines that the maintenance work is not normal, and the warning unit 310 transmits a warning to the server 2 even if the vehicle 1 is located in the region (geofence).

Alternatively, the state determination unit 320 further acquires identification information from the battery 12 (power supply device) after the end of maintenance. If the acquired identification information is different from authentic identification information, the state determination unit 320 determines that the maintenance work is not normal. In this case, the warning unit 310 transmits a warning to the server 2 even if the vehicle 1 is located in the region (geofence). Even in the geofence, if the voltage value is 0 after the elapse of a predetermined time, the warning unit 310 transmits a warning to the server 2. This makes it possible to prevent battery attachment from being forgotten or prevent the battery in the TCU from being exhausted due to long-time detachment of the battery.

According to this embodiment, even if the voltage information of the power supply device cannot be acquired, transmission of a warning can be suppressed if the vehicle is in the maintenance state. Hence, if the straddle type vehicle is in the maintenance state, the user can perform a maintenance work without issuance of a warning.

Second Embodiment

In this embodiment, a configuration will be described in which processing of a warning unit 310 is suppressed based on an operation input for setting the state of a vehicle 1 in a maintenance state from the terminal device of a user. The configuration of a vehicle remote control system SY is the same as in the first embodiment, and constituent elements will be described by adding the same reference numerals to the same or similar components. Also, in this embodiment, based on the presence/absence of an operation input from an operation portion 610 (FIG. 6) configured to set the state of the vehicle 1 to the maintenance state, a state determination unit 320 determines whether the vehicle 1 is in the maintenance state.

(Processing of TCU)

Figure 6:
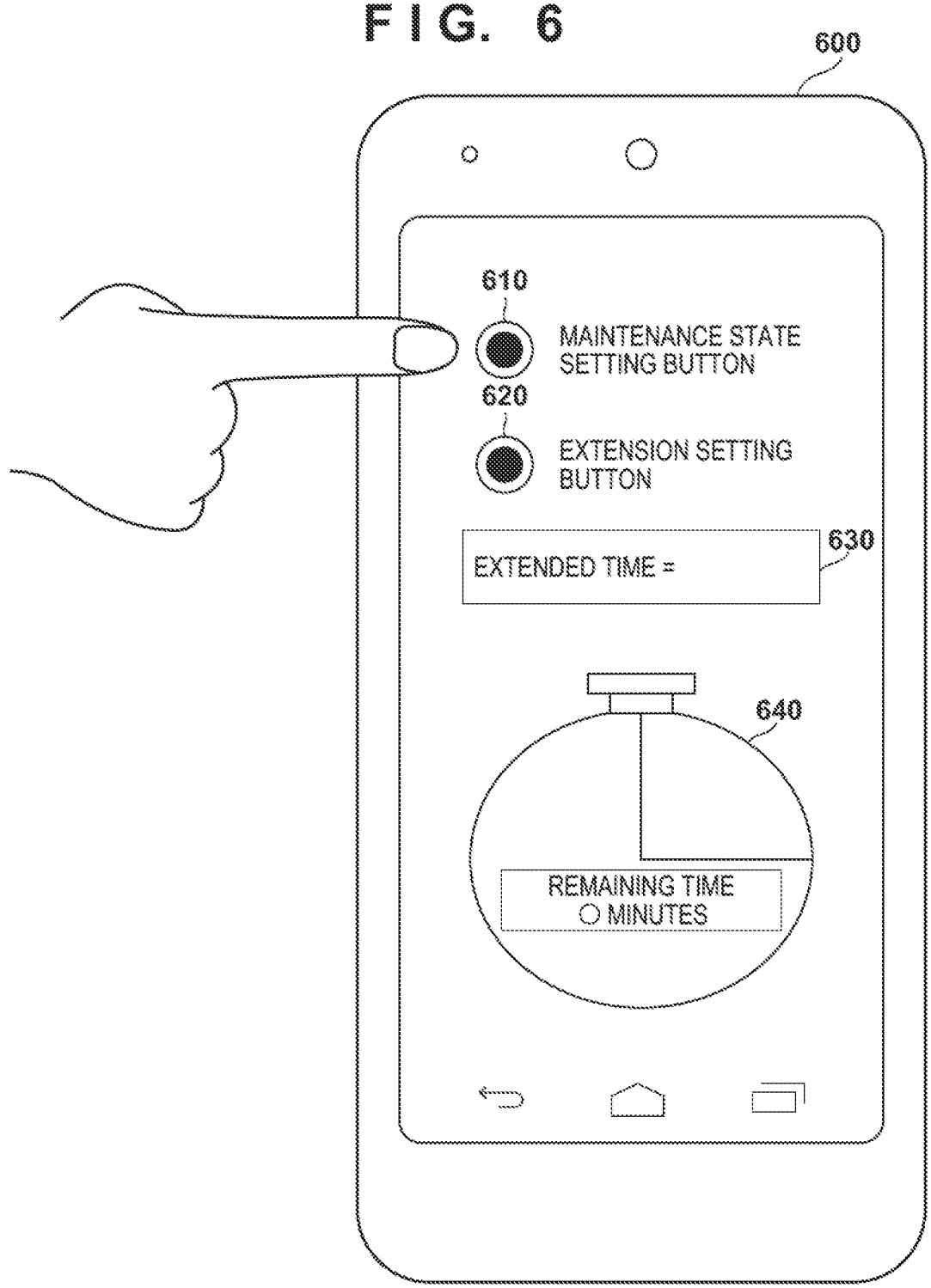
FIG. 6 is a view showing a terminal device of a user.

FIG. 6 is a view showing a terminal device 600 of a user. If voltage information cannot be acquired from a power supply device 12 that supplies power, the terminal device 600 sets the vehicle 1 in the maintenance state to suppress transmission of a warning for notifying an abnormality of the vehicle 1. The terminal device 600 includes the operation portion 610 that sets the state of the vehicle 1 to the maintenance state during the time until a predetermined time elapses, an extension operation portion 620 that extends the time until the predetermined time elapses, and an extended time setting portion 630 that sets the extended time to extend the time based on a time input by a user operation. In FIG. 6, the operation portion 610 (maintenance state setting button) sets the state of the vehicle 1 to the maintenance state by a user operation. Also, the extension operation portion 620 (extension setting button) sets extension of the maintenance time in the vehicle 1 by a user operation. To extend the maintenance time, a default extended time set in advance can be set. Alternatively, when a time is input to the extended time setting portion 630 by a user operation, and the extension operation portion 620 (extension operation button) is operated (a determination operation is input), the extended time setting portion 630 can set the extended time based on the extended time input by the user operation.

If T1 (for example, 5 min) is input as the extended time by the user operation, the extended time setting portion 630 can set, as the extended time, time T2 (=T1+α: for example, 7 min) obtained by adding an extra time α (for example, 2 min) to the extended time T1 input by the user operation. This makes it possible to set a maintenance time longer than the maintenance time assumed by the user and suppress transmission of a warning within the extended time including the added extra time α. The user can perform a maintenance work without issuance of a warning within the extended time including the added extra time.

A remaining maintenance time is displayed in a remaining time display portion 640 of the terminal device 600. For example, when the user operates the operation portion 610 (maintenance state setting button), a time counted down from a predetermined time set as the maintenance time is displayed as the remaining time. Similarly, when the user operates the extension operation portion 620 (extension setting button) or the extended time setting portion 630, a time counted down from the extended time is displayed as the remaining time. Processing of the operation portion 610, the extension operation portion 620, and the extended time setting portion 630 and display control of the remaining time display portion 640 can be performed by the CPU of the terminal device 600. The CPU of the terminal device 600 can perform not only communication with a server 2 but also communication with a communication device 16. If the user confirms the display on the remaining time display portion 640 and confirms that the maintenance work does not end within a predetermined time, the maintenance time can be extended by operating the extension operation portion 620.

FIG. 7 is a flowchart for explaining the procedure of processing by a TCU (the warning unit 310, the state determination unit 320, and a processing suppression unit 330). First, in step S710, the state determination unit 320 determines the presence/absence of an operation input from the operation portion 610 to set the state of the vehicle 1 to the maintenance state. If an operation input from the operation portion 610 is absent (NO in step S710), in step S740, the state determination unit 320 determines that the vehicle 1 is not in the maintenance state.

Then, in step S750, the processing suppression unit 330 does not suppress the processing of the warning unit 310. In this case, if voltage information cannot be acquired from the battery 12 (power supply device), it is determined that the vehicle 1 has an abnormality, and the warning unit 310 transmits a warning for notifying the abnormality of the vehicle 1 to the server 2.

On the other hand, if an operation input from the operation portion 610 is present in the determination processing of step S710 (YES in step S710), in step S720, the state determination unit 320 determines that the vehicle 1 is in the maintenance state.

Then, in step S730, the processing suppression unit 330 suppresses the processing of the warning unit 310 until a predetermined time elapses from the operation input. In this case, even if voltage information from the battery 12 (power supply device) or control information from a control device 15 cannot be acquired during the time until the predetermined time elapses, it is not determined that the vehicle 1 has an abnormality, and the processing suppression unit 330 suppresses the processing of the warning unit 310 such that a warning is not transmitted.

Here, in the determination processing of step S710, the state determination unit 320 may count the number of times of operation inputs from the operation portion 610 during a predetermined period. If the number of times of operation inputs exceeds a count limit serving as a reference, the warning unit 310 can transmit a warning for notifying the abnormality of the vehicle 1 to the server 2.

Also, in step S730, if an operation of setting extension of a predetermined time is input from the extension operation portion 620, the processing suppression unit 330 can set the extended time extended by the predetermined time and suppress the processing of the warning unit 310 until the extended time elapses.

In addition, the state determination unit 320 can determine whether a maintenance work is normal. For example, if voltage information acquired from the battery 12 (power supply device) after the elapse of a predetermined time is equal to or less than a voltage value serving as a reference, the state determination unit 320 determines that the maintenance work is not normal, and the warning unit 310 transmits a warning to the server 2.

Alternatively, the state determination unit 320 further acquires identification information from the battery 12 (power supply device) after the elapse of a predetermined time. If the acquired identification information is different from authentic identification information, the state determination unit 320 determines that the maintenance work is not normal, and the warning unit 310 transmits a warning to the server 2.

According to this embodiment, even if the voltage information of the power supply device cannot be acquired, transmission of a warning can be suppressed if the vehicle is in the maintenance state. Hence, if the straddle type vehicle is in the maintenance state, the user can perform a maintenance work without issuance of a warning.

In the above description, the elements are represented by names associated with their functions to facilitate understanding. However, the elements are not limited to those having the contents described in the embodiments as the main functions and may auxiliarily have the functions. For example, although the straddle type vehicle 1 has been described as a typical example in the embodiments, the contents of the embodiments can be applied to a variety of vehicles.

[Summary of Embodiments]

Arrangement 1. A vehicle remote control system according to the above-described embodiment is a vehicle remote control system according to the above-described embodiment is a vehicle remote control system (for example, SY in FIG. 1) including a vehicle (for example, the vehicle 1 in FIG. 1) and a server (for example, the server 2 in FIG. 1) configured to remote-control the vehicle (1) via a communication device (for example, 16 in FIG. 1), wherein the communication device comprises:

an acquisition unit configured to acquire control information representing a control state of the vehicle from a control device (15) configured to control the vehicle (1) and voltage information from a power supply device (12) configured to supply power to the vehicle (1);

a transmission unit (16) configured to transmit the control information and the voltage information to the server (2);

a warning unit (310) configured to, if the voltage information cannot be acquired, transmit a warning for notifying an abnormality of the vehicle (1) to the server (2); and a processing suppression unit (330) configured to, if the vehicle (1) is in a maintenance state, suppress processing of the warning unit (310) such that the warning is not transmitted, and the server (2) comprises:

a reception unit (23) configured to receive the warning for notifying the abnormality of the vehicle (1);

a generation unit (21) configured to generate a control signal for remote-controlling the vehicle (1) based on the warning received by the reception unit (23); and a transmission unit (23) configured to transmit the control signal generated by the generation unit (21) to the communication device (16).

According to the vehicle remote control system of Arrangement 1, even if the voltage information of the power supply device cannot be acquired, transmission of the warning can be suppressed if the vehicle is in the maintenance state. Hence, if the vehicle is in the maintenance state, the user can perform a maintenance work without issuance of a warning.

Arrangement 2. In the vehicle remote control system (SY) according to the above-described embodiment, the communication device (16) further comprises a state determination unit (320) configured to determine, based on position information of the vehicle (1), whether the vehicle (1) is in the maintenance state, the state determination unit (320) acquires region information of a region where maintenance is permitted and the position information of the vehicle (1), and if the vehicle (1) is located in the region, and the control information can be acquired, determines that the vehicle (1) is in the maintenance state, and the processing suppression unit (330) suppresses the processing of the warning unit (310) based on the determination of the state determination unit (320).

According to the vehicle remote control system of Arrangement 2, it is possible to determine, based on the position information of the vehicle, whether the vehicle is in the maintenance state. If the vehicle is located in the region (geofence), and the control information can be acquired, it is possible to determine that the vehicle is in a normal maintenance state and suppress transmission of the warning. Hence, if the vehicle is in the maintenance state, the user can perform a maintenance work without issuance of a warning.

Also, even if the vehicle is located in the region (geofence), if the control information cannot be acquired, it can be determined that, for example, the vehicle is a state of a theft (vehicle abnormality) in which the TCU and a nongenuine battery are left in a connected state, and the vehicle 1 is taken away (NO in step S530). In this case, it is determined that abnormal maintenance is performed, and a warning can be transmitted to the server (S560, S570).

Arrangement 3. In the vehicle remote control system (SY) according to the above-described embodiment, if the voltage information acquired from the power supply device (12) after an end of the maintenance is not more than a voltage value serving as a reference, the warning unit (310) transmits the warning to the server (2) even if the vehicle (1) is located in the region.

According to the vehicle remote control system of Arrangement 3, if the voltage information acquired from the power supply device after the end of the maintenance is not more than the voltage value serving as a reference, for example, if a nongenuine battery (power supply device) that does not output a predetermined voltage value is connected to the TCU, it is determined that abnormal maintenance is performed, and a warning can be transmitted to the server.

Arrangement 4. In the vehicle remote control system (SY) according to the above-described embodiment, the acquisition unit (300) further acquires identification information from the power supply device (12) after the end of the maintenance, and if the acquired identification information is different from authentic identification information, the warning unit (310) transmits the warning to the server (2) even if the vehicle (1) is located in the region.

According to the vehicle remote control system of Arrangement 4, if the identification information acquired from the power supply device after the end of the maintenance is different from authentic identification information, for example, if a nongenuine battery (power supply device) that does not have the authentic identification information is connected to the TCU, it is determined that abnormal maintenance is performed, and a warning can be transmitted to the server.

Arrangement 5. In the vehicle remote control system (SY) according to the above-described embodiment, the state determination unit (320) acquires the region information of the region where maintenance is permitted and the position information of the vehicle (1), and if the vehicle (1) is not located in the region, determines that the vehicle (1) is not in the maintenance state, and the warning unit (310) transmits the warning for notifying the abnormality of the vehicle (1) to the server (2) based on the determination of the state determination unit (320).

According to the vehicle remote control system of Arrangement 5, if the vehicle is not in the maintenance state, a warning for notifying a vehicle abnormality that the voltage information of the power supply device cannot be acquired can be transmitted to the server.

Arrangement 6. In the vehicle remote control system (SY) according to the above-described embodiment, the communication device (16) further comprises a geofence setting unit (340) configured to set the region where maintenance is permitted, and based on position information of a designated base of maintenance, the geofence setting unit (340) sets an area within a predetermined range as the region where maintenance is permitted.

According to the vehicle remote control system of Arrangement 6, based on the position information of the designated base of maintenance, the area within the predetermined range can be set as the region (geofence) where maintenance is permitted.

Arrangement 7. In the vehicle remote control system (SY) according to the above-described embodiment, the vehicle remote control system (SY) further comprises a terminal device (600) configured to, if the voltage information cannot be acquired from the power supply device (12) configured to supply power, set the vehicle (1) in the maintenance state to suppress transmission of the warning for notifying the abnormality of the vehicle (1), and the terminal device (600) comprises:

an operation unit (610) configured to set a state of the vehicle (1) to the maintenance state during a time until a predetermined time elapses;

an extension operation unit (620) configured to extend the time until the predetermined time elapses; and an extended time setting unit (630) configured to set an extended time to extend the time based on a time (T1) input by a user operation.

According to the vehicle remote control system of Arrangement 7, even if the voltage information of the power supply device cannot be acquired, transmission of the warning can be suppressed by setting the vehicle in the maintenance state. Hence, if the vehicle is in the maintenance state, the user can perform a maintenance work without issuance of a warning.

Arrangement 8. In the vehicle remote control system (SY) according to the above-described embodiment, the communication device (16) further comprises a state determination unit (320) configured to determine, based on presence/absence of an operation input from the operation unit (610), whether the vehicle (1) is in the maintenance state, the state determination unit (320) determines the presence/absence of the operation input from the operation unit (610), and if the operation input is present, determines that the vehicle (1) is in the maintenance state, and the processing suppression unit (330) suppresses the processing of the warning unit (310) until a predetermined time elapses from the operation input based on the determination of the state determination unit (320).

According to the vehicle remote control system of Arrangement 8, for example, if an operation input for setting the state of the vehicle to the maintenance state is input from the terminal device of the user, it is possible to determine that the vehicle is in the maintenance state until the predetermined time elapses from the predetermined time and suppress transmission of the warning. Hence, if the vehicle is in the maintenance state, the user can perform a maintenance work without issuance of a warning.

Arrangement 9. In the vehicle remote control system (SY) according to the above-described embodiment, if an operation from the extension operation unit (620) is input, the processing suppression unit (330) sets a default extended time to extend the predetermined time, and suppresses the processing of the warning unit (310) until the extended time elapses.

According to the vehicle remote control system of Arrangement 9, if the operation from the extension operation means is input, the default extended time to extend the predetermined time is set, and transmission of the warning can be suppressed until the extended time elapses. Hence, until the extended time elapses, the user can perform a maintenance work without issuance of a warning.

Arrangement 10. In the vehicle remote control system (SY) according to the above-described embodiment, the extended time setting unit (630) sets, as the extended time, a time (T2) obtained by adding an extra time ($\alpha$) to the extended time (T1) input by a user operation, and the processing suppression unit (330) suppresses the processing of the warning unit (310) until the extended time set by the extended time setting unit (630) elapses.

According to the vehicle remote control system of Arrangement 10, it is possible to set a maintenance time longer than the maintenance time assumed by the user and suppress transmission of the warning within the extended time including the added extra time. The user can perform a maintenance work without issuance of a warning within the extended time including the added extra time.

Arrangement 11. In the vehicle remote control system (SY) according to the above-described embodiment, the state determination unit (320) counts the number of times of operation inputs from the operation unit (610) during a predetermined period, and if the number of times of operation inputs exceeds a count limit serving as a reference, the warning unit (310) transmits the warning for notifying the abnormality of the vehicle (1) to the server (2).

According to the vehicle remote control system of Arrangement 11, if the number of times of operation inputs within the predetermined period exceeds the count limit serving as a reference, it is determined that abnormal maintenance is performed, and a warning can be transmitted to the server.

Arrangement 12. In the vehicle remote control system (SY) according to the above-described embodiment, if the voltage information acquired from the power supply device (12) after the elapse of the predetermined time is not more than a voltage value serving as a reference, the warning unit (310) transmits the warning to the server (2).

According to the vehicle remote control system of Arrangement 12, if the voltage information acquired from the power supply device after the elapse of the predetermined time is not more than the voltage value serving as a reference, for example, if a nongenuine battery (power supply device) that does not output a predetermined voltage value is connected to the TCU, it is determined that abnormal maintenance is performed, and a warning can be transmitted to the server.

Arrangement 13. In the vehicle remote control system (SY) according to the above-described embodiment, the acquisition unit (300) further acquires identification information from the power supply device (12) after the elapse of the predetermined time, and if the acquired identification information is different from authentic identification information, the warning unit (310) transmits the warning to the server (2).

According to the vehicle remote control system of Arrangement 13, if the identification information acquired from the power supply device after the elapse of the predetermined time is different from authentic identification information, for example, if a nongenuine battery (power supply device) that does not have the authentic identification information is connected to the TCU, it is determined that abnormal maintenance is performed, and a warning can be transmitted to the server.

Arrangement 14. A vehicle remote control method according to the above-described embodiment is a vehicle remote control method in a vehicle remote control system (for example, SY in FIG. 1) including a vehicle (for example, the vehicle 1 in FIG. 1) and a server (for example, the server 2 in FIG. 1) configured to remote-control the vehicle (1) via a communication device (for example, 16 in FIG. 1), comprising:

an acquisition step of acquiring control information representing a control state of the vehicle (1) from a control device (for example, 15 in FIG. 1) configured to control the vehicle (1) and voltage information from a power supply device (for example, 12 in FIG. 1) configured to supply power to the vehicle (1);

a transmission step of transmitting the control information and the voltage information to the server (2);

a warning step of, if the voltage information cannot be acquired, transmitting a warning for notifying an abnormality of the vehicle (1) to the server (2);

a processing suppression step of, if the vehicle (1) is in a maintenance state, suppressing processing of the warning step such that the warning is not transmitted;

a reception step of receiving the warning for notifying the abnormality of the vehicle (1);

a generation step of generating a control signal for remote-controlling the vehicle (1) based on the warning received in the reception step; and a transmission step of transmitting the control signal generated in the generation step to the communication device (16).

According to the vehicle remote control method of Arrangement 14, even if the voltage information of the power supply device cannot be acquired, transmission of the warning can be suppressed if the vehicle is in the maintenance state. Hence, if the vehicle is in the maintenance state, the user can perform a maintenance work without issuance of a warning.

Arrangement 15. The vehicle remote control method according to the above-described embodiment further comprises a state determination step of determining, based on position information of the vehicle (1), whether the vehicle (1) is in the maintenance state, wherein in the state determination step, region information of a region where maintenance is permitted and the position information of the vehicle (1) are acquired, and if the vehicle (1) is located in the region, and the control information can be acquired, it is determined that the vehicle (1) is in the maintenance state, and in the processing suppression step, the processing of the warning step is suppressed based on the determination of the state determination step.

According to the vehicle remote control method of Arrangement 15, it is possible to determine, based on the position information of the vehicle, whether the vehicle is in the maintenance state. If the vehicle is located in the region (geofence), and the control information can be acquired, it is possible to determine that the vehicle is in a normal maintenance state and suppress transmission of the warning. Hence, if the vehicle is in the maintenance state, the user can perform a maintenance work without issuance of a warning.

Also, even if the vehicle is located in the region (geofence), if the control information cannot be acquired, it can be determined that, for example, the vehicle is a state of a theft (vehicle abnormality) in which the TCU and a nongenuine battery are left in a connected state, and the vehicle 1 is taken away (NO in step S530). In this case, it is determined that abnormal maintenance is performed, and a warning can be transmitted to the server (S560, S570).

Arrangement 16. In the vehicle remote control method according to the above-described embodiment, in the warning step, if the voltage information acquired from the power supply device (12) after an end of the maintenance is not more than a voltage value serving as a reference, the warning is transmitted to the server (2) even if the vehicle (1) is located in the region.

According to the vehicle remote control method of Arrangement 16, if the voltage information acquired from the power supply device after the end of the maintenance is not more than the voltage value serving as a reference, for example, if a nongenuine battery (power supply device) that does not output a predetermined voltage value is connected to the TCU, it is determined that abnormal maintenance is performed, and a warning can be transmitted to the server.

Arrangement 17. The vehicle remote control method according to the above-described embodiment further comprises a step of acquiring identification information from the power supply device (12) after the end of the maintenance, wherein in the warning step, if the acquired identification information is different from authentic identification information, the warning is transmitted to the server (2) even if the vehicle (1) is located in the region.

According to the vehicle remote control method of Arrangement 17, if the identification information acquired from the power supply device after the end of the maintenance is different from authentic identification information, for example, if a nongenuine battery (power supply device) that does not have the authentic identification information is connected to the TCU, it is determined that abnormal maintenance is performed, and a warning can be transmitted to the server.

Arrangement 18. In the vehicle remote control method according to the above-described embodiment, in the state determination step, the region information of the region where maintenance is permitted and the position information of the vehicle (1) are acquired, and if the vehicle (1) is not located in the region, it is determined that the vehicle (1) is not in the maintenance state, and in the warning step, the warning for notifying the abnormality of the vehicle (1) is transmitted to the server (2) based on the determination of the state determination step.

According to the vehicle remote control method of Arrangement 18, if the vehicle is not in the maintenance state, a warning for notifying a vehicle abnormality that the voltage information of the power supply device cannot be acquired can be transmitted to the server.

Arrangement 19. The vehicle remote control method according to the above-described embodiment, further comprises a setting step of setting the region where maintenance is permitted, wherein in the setting step, based on position information of a designated base of maintenance, an area within a predetermined range is set as the region where maintenance is permitted.

According to the vehicle remote control method of Arrangement 19, based on the position information of the designated base of maintenance, the area within the predetermined range can be set as the region (geofence) where maintenance is permitted.

Arrangement 20. The vehicle remote control method according to the above-described embodiment further comprises a state determination step of determining, based on presence/absence of an operation input from an operation unit (610) configured to set the state of the vehicle (1) to the maintenance state, whether the vehicle (1) is in the maintenance state, wherein in the state determination step, the presence/absence of the operation input from the operation unit (610) configured to set the state of the vehicle (1) to the maintenance state is determined, and if the operation input is present, it is determined that the vehicle (1) is in the maintenance state, and in the processing suppression step, the processing of the warning step is suppressed until a predetermined time elapses from the operation input based on the determination of the state determination step.

According to the vehicle remote control method of Arrangement 20, for example, if an operation input for setting the state of the vehicle to the maintenance state is input from the terminal device of the user, it is possible to determine that the vehicle is in the maintenance state until the predetermined time elapses from the predetermined time and suppress transmission of the warning. Hence, if the vehicle is in the maintenance state, the user can perform a maintenance work without issuance of a warning.

Arrangement 21. In the vehicle remote control method according to the above-described embodiment, in the processing suppression step, if an operation from an extension operation unit (620) configured to set extension of the predetermined time is input, a default extended time to extend the predetermined time is set, and the processing of the warning step is suppressed until the extended time elapses.

According to the vehicle remote control method of Arrangement 21, if the operation from the extension operation unit is input, the default extended time to extend the predetermined time is set, and transmission of the warning can be suppressed until the extended time elapses. Hence, until the extended time elapses, the user can perform a maintenance work without issuance of a warning.

Arrangement 22. The vehicle remote control method according to the above-described embodiment, further comprises an extended time setting step of setting, as the extended time, a time (T2) obtained by adding an extra time ($\alpha$) to the extended time (T1) input by the user operation, wherein in the processing suppression step, the processing of the warning step is suppressed until the extended time set in the extended time setting step elapses.

According to the vehicle remote control method of Arrangement 22, it is possible to set a maintenance time longer than the maintenance time assumed by the user and suppress transmission of the warning within the extended time including the added extra time. The user can perform a maintenance work without issuance of a warning within the extended time including the added extra time.

Arrangement 23. In the vehicle remote control method according to the above-described embodiment, in the state determination step, the number of times of operation inputs from the operation unit (610) during a predetermined period is counted, and in the warning step, if the number of times of operation inputs exceeds a count limit serving as a reference, the warning for notifying the abnormality of the vehicle (1) is transmitted to the server (2).

According to the vehicle remote control method of Arrangement 23, if the number of times of operation inputs within the predetermined period exceeds the count limit serving as a reference, it is determined that abnormal maintenance is performed, and a warning can be transmitted to the server.

Arrangement 24. In the vehicle remote control method according to the above-described embodiment, in the warning step, if the voltage information acquired from the power supply device (12) after the elapse of the predetermined time is not more than a voltage value serving as a reference, the warning is transmitted to the server (2).

According to the vehicle remote control method of Arrangement 24, if the voltage information acquired from the power supply device after the elapse of the predetermined time is not more than the voltage value serving as a reference, for example, if a nongenuine battery (power supply device) that does not output a predetermined voltage value is connected to the TCU, it is determined that abnormal maintenance is performed, and a warning can be transmitted to the server.

Arrangement 25. In the vehicle remote control method according to the above-described embodiment, identification information is further acquired from the power supply device (12) after the elapse of the predetermined time, and in the warning step, if the acquired identification information is different from authentic identification information, the warning is transmitted to the server (2).

According to the vehicle remote control method of Arrangement 25, if the identification information acquired from the power supply device after the elapse of the predetermined time is different from authentic identification information, for example, if a nongenuine battery (power supply device) that does not have the authentic identification information is connected to the TCU, it is determined that abnormal maintenance is performed, and a warning can be transmitted to the server.

Arrangement 26. A server according to the above-described embodiment is a server (2) configured to remote-control a vehicle (1) via a communication device (16) including a warning unit (310) configured to, if voltage information cannot be acquired from a power supply device (12) configured to supply power, transmit a warning for notifying an abnormality, and a processing suppression unit (330) configured to, if the vehicle (1) is in a maintenance state, suppress processing of the warning unit (310) such that the warning is not transmitted, the server comprising:

a reception unit (23) configured to receive the warning for notifying the abnormality of the vehicle (1);

a generation unit (21) configured to generate a control signal for remote-controlling the vehicle (1) based on the warning received by the reception unit (23); and a transmission unit (23) configured to transmit the control signal generated by the generation unit (21) to the communication device (16).

According to the server of Arrangement 26, if the warning for notifying a vehicle abnormality is received, it is possible to generate the control signal used to remote-control the vehicle and transmit the generated control signal to the communication device of the vehicle. The communication device (TCU) can intervene in vehicle control by the control device 15 based on the information received from the server and control the control device 15 to restrict the functions of the vehicle.

Arrangement 27. A terminal device according to the above-described embodiment is a terminal device (600) configured to, if voltage information cannot be acquired from a power supply device (12) configured to supply power, set a vehicle (1) in a maintenance state to suppress transmission of a warning for notifying an abnormality of the vehicle (1), the terminal device comprising:

an operation unit (610) configured to set a state of the vehicle (1) to the maintenance state during a time until a predetermined time elapses;

an extension operation unit (620) configured to extend the time until the predetermined time elapses; and an extended time setting unit (630) configured to set an extended time to extend the time based on a time (T1) input by a user operation.

According to the terminal device of Arrangement 27, even if the voltage information of the power supply device cannot be acquired, transmission of the warning can be suppressed if the vehicle is in the maintenance state. Hence, if the vehicle is in the maintenance state, the user can perform a maintenance work without issuance of a warning.

Arrangement 28. In the terminal device (600) according to the above-described embodiment, the extended time setting unit (630) sets, as the extended time, a time (T2) obtained by adding an extra time (α) to the extended time (T1) input by the user operation.

According to the terminal device of Arrangement 28, it is possible to set a maintenance time longer than the maintenance time assumed by the user and suppress transmission of the warning within the extended time including the added extra time. The user can perform a maintenance work without issuance of a warning within the extended time including the added extra time.

Arrangement 29. A communication device according to the above-described embodiment comprises:

an acquisition unit (300) configured to acquire control information representing a control state of a vehicle (1) from a control device (15) configured to control the vehicle (1) and voltage information from a power supply device (12) configured to supply power to the vehicle (1);

a transmission unit (16) configured to transmit the control information and the voltage information to a server (2);

a warning unit (310) configured to, if the voltage information cannot be acquired, transmit a warning for notifying an abnormality of the vehicle (1) to the server (2); and a processing suppression unit (330) configured to, if the vehicle (1) is in a maintenance state, suppress processing of the warning unit (310) such that the warning is not transmitted.

According to the communication device of Arrangement 29, even if the voltage information of the power supply device cannot be acquired, transmission of the warning can be suppressed if the vehicle is in the maintenance state. Hence, if the vehicle is in the maintenance state, the user can perform a maintenance work without issuance of a warning.

Arrangement 30. The communication device (16) according to the above-described embodiment further comprising a state determination unit (320) configured to determine, based on position information of the vehicle (1), whether the vehicle (1) is in the maintenance state, wherein the state determination unit (320) acquires region information of a region where maintenance is permitted and the position information of the vehicle (1), and if the vehicle (1) is located in the region, and the control information can be acquired, determines that the vehicle (1) is in the maintenance state, and the processing suppression unit (330) suppresses the processing of the warning unit (310) based on the determination of the state determination unit (320).

According to the communication device of Arrangement 30, it is possible to determine, based on the position information of the vehicle, whether the vehicle is in the maintenance state. If the vehicle is located in the region (geofence), and the control information can be acquired, it is possible to determine that the vehicle is in a normal maintenance state and suppress transmission of the warning. Hence, if the vehicle is in the maintenance state, the user can perform a maintenance work without issuance of a warning.

Also, even if the vehicle is located in the region (geofence), if the control information cannot be acquired, it can be determined that, for example, the vehicle is a state of a theft (vehicle abnormality) in which the TCU and a nongenuine battery are left in a connected state, and the vehicle 1 is taken away (NO in step S530). In this case, it is determined that abnormal maintenance is performed, and a warning can be transmitted to the server (S560, S570).

Arrangement 31. In the communication device (16) according to the above-described embodiment, if the voltage information acquired from the power supply device (12) after an end of the maintenance is not more than a voltage value serving as a reference, the warning unit (310) transmits the warning to the server (2) even if the vehicle (1) is located in the region.

According to the communication device of Arrangement 31, if the voltage information acquired from the power supply device after the end of the maintenance is not more than the voltage value serving as a reference, for example, if a nongenuine battery (power supply device) that does not output a predetermined voltage value is connected to the TCU, it is determined that abnormal maintenance is performed, and a warning can be transmitted to the server.

Arrangement 32. In the communication device (16) according to the above-described embodiment, the state determination unit (320) further acquires identification information from the power supply device (12) after the end of the maintenance, and if the acquired identification information is different from authentic identification information, the warning unit (310) transmits the warning to the server (2) even if the vehicle (1) is located in the region.

According to the communication device of Arrangement 32, if the identification information acquired from the power supply device after the end of the maintenance is different from authentic identification information, for example, if a nongenuine battery (power supply device) that does not have the authentic identification information is connected to the TCU, it is determined that abnormal maintenance is performed, and a warning can be transmitted to the server.

Arrangement 33. In the communication device (16) according to the above-described embodiment, the state determination unit (320) acquires the region information of the region where maintenance is permitted and the position information of the vehicle (1), and if the vehicle (1) is not located in the region, determines that the vehicle (1) is not in the maintenance state, and the warning unit (310) transmits the warning for notifying the abnormality of the vehicle (1) to the server (2) based on the determination of the state determination unit (320).

According to the communication device of Arrangement 33, if the vehicle is not in the maintenance state, a warning for notifying a vehicle abnormality that the voltage information of the power supply device cannot be acquired can be transmitted to the server.

Arrangement 34. The communication device (16) according to the above-described embodiment further comprising a geofence setting unit (340) configured to set the region where maintenance is permitted, wherein based on position information of a designated base of maintenance, the geofence setting unit (340) sets an area within a predetermined range as the region where maintenance is permitted.

According to the communication device of Arrangement 34, based on the position information of the designated base of maintenance, the area within the predetermined range can be set as the region (geofence) where maintenance is permitted.

Arrangement 35. The communication device (16) according to the above-described embodiment further comprising a state determination unit (320) configured to determine, based on presence/absence of an operation input from an operation unit (610) configured to set the state of the vehicle (1) to the maintenance state, whether the vehicle (1) is in the maintenance state, wherein the state determination unit (320) determines the presence/absence of the operation input from the operation unit (610) configured to set the state of the vehicle (1) to the maintenance state, and if the operation input is present, the state determination unit (320) determines that the vehicle (1) is in the maintenance state, and the processing suppression unit (330) suppresses the processing of the warning unit (310) until a predetermined time elapses from the operation input based on the determination of the state determination unit (320).

According to the communication device of Arrangement 35, for example, if an operation input for setting the state of the vehicle to the maintenance state is input from the terminal device of the user, it is possible to determine that the vehicle is in the maintenance state until the predetermined time elapses from the predetermined time and suppress transmission of the warning. Hence, if the vehicle is in the maintenance state, the user can perform a maintenance work without issuance of a warning.

Arrangement 36. In the communication device (16) according to the above-described embodiment, if an operation from an extension operation unit (620) configured to set extension of the predetermined time is input, the processing suppression unit (330) sets a default extended time to extend the predetermined time, and suppresses the processing of the warning unit (310) until the extended time elapses.

According to the communication device of Arrangement 36, if the operation from the extension operation means is input, the default extended time to extend the predetermined time is set, and transmission of the warning can be suppressed until the extended time elapses. Hence, until the extended time elapses, the user can perform a maintenance work without issuance of a warning.

Arrangement 37. In the communication device (16) according to the above-described embodiment, if the set extended time is input from an extended time setting unit (630) configured to set, as the extended time, a time (T2) obtained by adding an extra time (α) to an extended time (T1) input by a user operation, the processing suppression unit (330) suppresses the processing of the warning unit (310) until the extended time set by the extended time setting unit (630) elapses.

According to the communication device of Arrangement 37, it is possible to set a maintenance time longer than the maintenance time assumed by the user and suppress transmission of the warning within the extended time including the added extra time. The user can perform a maintenance work without issuance of a warning within the extended time including the added extra time.

Arrangement 38. In the communication device (16) according to the above-described embodiment, the state determination unit (320) counts the number of times of operation inputs from the operation unit (610) during a predetermined period, and if the number of times of operation inputs exceeds a count limit serving as a reference, the warning unit (310) transmits the warning for notifying the abnormality of the vehicle (1) to the server (2).

According to the communication device of Arrangement 38, if the number of times of operation inputs within the predetermined period exceeds the count limit serving as a reference, it is determined that abnormal maintenance is performed, and a warning can be transmitted to the server.

Arrangement 39. In the communication device (16) according to the above-described embodiment, if the voltage information acquired from the power supply device (12) after the elapse of the predetermined time is not more than a voltage value serving as a reference, the warning unit (310) transmits the warning to the server (2).

According to the communication device of Arrangement 39, if the voltage information acquired from the power supply device after the elapse of the predetermined time is not more than the voltage value serving as a reference, for example, if a nongenuine battery (power supply device) that does not output a predetermined voltage value is connected to the TCU, it is determined that abnormal maintenance is performed, and a warning can be transmitted to the server.

Arrangement 40. In the communication device (16) according to the above-described embodiment, the state determination unit (320) further acquires identification information from the power supply device (12) after the elapse of the predetermined time, and if the acquired identification information is different from authentic identification information, the warning unit (310) transmits the warning to the server (2).

According to the communication device of Arrangement 40, if the identification information acquired from the power supply device after the elapse of the predetermined time is different from authentic identification information, for example, if a nongenuine battery (power supply device) that does not have the authentic identification information is connected to the TCU, it is determined that abnormal maintenance is performed, and a warning can be transmitted to the server.

The present invention is not limited to the above embodiments and various changes and modifications can be made within the spirit and scope of the present invention. Therefore, to apprise the public of the scope of the present invention, the following claims are made.

What is claimed is:

1. A vehicle remote control system including a vehicle and a server configured to remote-control the vehicle via a communication device, wherein the communication device comprises:

an acquisition unit configured to acquire control information representing a control state of the vehicle from a control device configured to control the vehicle and voltage information from a power supply device configured to supply power to the vehicle;

a transmission unit configured to transmit the control information and the voltage information to the server;

a warning unit configured to, if the voltage information cannot be acquired, transmit a warning for notifying an abnormality of the vehicle to the server; and a processing suppression unit configured to, if the vehicle is in a maintenance state, suppress processing of the warning unit such that the warning is not transmitted, and the server comprises:
a reception unit configured to receive the warning for notifying the abnormality of the vehicle;
a generation unit configured to generate a control signal for remote-controlling the vehicle based on the warning received by the reception unit; and
a transmission unit configured to transmit the control signal generated by the generation unit to the communication device.

2. The vehicle remote control system according to claim 1, wherein
the communication device further comprises a state determination unit configured to determine, based on position information of the vehicle, whether the vehicle is in the maintenance state,
the state determination unit acquires region information of a region where maintenance is permitted and the position information of the vehicle, and if the vehicle is located in the region, and the control information can be acquired, determines that the vehicle is in the maintenance state, and
the processing suppression unit suppresses the processing of the warning unit based on the determination of the state determination unit.

3. The vehicle remote control system according to claim 2, wherein if the voltage information acquired from the power supply device after an end of the maintenance is not more than a voltage value serving as a reference, the warning unit transmits the warning to the server even if the vehicle is located in the region.

4. The vehicle remote control system according to claim 2, wherein the acquisition unit further acquires identification information from the power supply device after the end of the maintenance, and
if the acquired identification information is different from authentic identification information, the warning unit transmits the warning to the server even if the vehicle is located in the region.

5. The vehicle remote control system according to claim 2, wherein
the state determination unit acquires the region information of the region where maintenance is permitted and the position information of the vehicle, and if the vehicle is not located in the region, determines that the vehicle is not in the maintenance state, and
the warning unit transmits the warning for notifying the abnormality of the vehicle to the server based on the determination of the state determination unit.

6. The vehicle remote control system according to claim 2, wherein
the communication device further comprises a geofence setting unit configured to set the region where maintenance is permitted, and
based on position information of a designated base of maintenance, the geofence setting unit sets an area within a predetermined range as the region where maintenance is permitted.

7. The vehicle remote control system according to claim 1, wherein
the vehicle remote control system further comprises a terminal device configured to, if the voltage information cannot be acquired from the power supply device configured to supply power, set the vehicle in the maintenance state to suppress transmission of the warning for notifying the abnormality of the vehicle, and
the terminal device comprises:
an operation unit configured to set a state of the vehicle to the maintenance state during a time until a predetermined time elapses;
an extension operation unit configured to extend the time until the predetermined time elapses; and
an extended time setting unit configured to set an extended time to extend the time based on a time input by a user operation.

8. The vehicle remote control system according to claim 7, wherein
the communication device further comprises a state determination unit configured to determine, based on presence/absence of an operation input from the operation unit, whether the vehicle is in the maintenance state,
the state determination unit determines the presence/absence of the operation input from the operation unit, and if the operation input is present, determines that the vehicle is in the maintenance state, and
the processing suppression unit suppresses the processing of the warning unit until a predetermined time elapses from the operation input based on the determination of the state determination unit.

9. The vehicle remote control system according to claim 8, wherein
the state determination unit counts the number of times of operation inputs from the operation unit during a predetermined period, and
if the number of times of operation inputs exceeds a count limit serving as a reference, the warning unit transmits the warning for notifying the abnormality of the vehicle to the server.

10. The vehicle remote control system according to claim 8, wherein if the voltage information acquired from the power supply device after the elapse of the predetermined time is not more than a voltage value serving as a reference, the warning unit transmits the warning to the server.

11. The vehicle remote control system according to claim 8, wherein
the acquisition unit further acquires identification information from the power supply device after the elapse of the predetermined time, and
if the acquired identification information is different from authentic identification information, the warning unit transmits the warning to the server.

12. The vehicle remote control system according to claim 7, wherein if an operation from the extension operation unit is input, the processing suppression unit sets a default extended time to extend the predetermined time, and suppresses the processing of the warning unit until the extended time elapses.

13. The vehicle remote control system according to claim 7, wherein
the extended time setting unit sets, as the extended time, a time obtained by adding an extra time to the extended time input by a user operation, and
the processing suppression unit suppresses the processing of the warning unit until the extended time set by the extended time setting unit elapses.

14. A vehicle remote control method in a vehicle remote control system including a vehicle and a server configured to remote-control the vehicle via a communication device, comprising:
an acquisition step of acquiring control information representing a control state of the vehicle from a control device configured to control the vehicle and voltage information from a power supply device configured to supply power to the vehicle;

a transmission step of transmitting the control information and the voltage information to the server;

a warning step of, if the voltage information cannot be acquired, transmitting a warning for notifying an abnormality of the vehicle to the server;

a processing suppression step of, if the vehicle is in a maintenance state, suppressing processing of the warning step such that the warning is not transmitted;

a reception step of receiving the warning for notifying the abnormality of the vehicle;

a generation step of generating a control signal for remote-controlling the vehicle based on the warning received in the reception step; and a transmission step of transmitting the control signal generated in the generation step to the communication device.

15. The vehicle remote control method according to claim 14, further comprising a state determination step of determining, based on position information of the vehicle, whether the vehicle is in the maintenance state, wherein in the state determination step, region information of a region where maintenance is permitted and the position information of the vehicle are acquired, and if the vehicle is located in the region, and the control information can be acquired, it is determined that the vehicle is in the maintenance state, and in the processing suppression step, the processing of the warning step is suppressed based on the determination of the state determination step.

16. The vehicle remote control method according to claim 15, wherein in the warning step, if the voltage information acquired from the power supply device after an end of the maintenance is not more than a voltage value serving as a reference, the warning is transmitted to the server even if the vehicle is located in the region.

17. The vehicle remote control method according to claim 15, further comprising a step of acquiring identification information from the power supply device after the end of the maintenance, wherein in the warning step, if the acquired identification information is different from authentic identification information, the warning is transmitted to the server even if the vehicle is located in the region.

18. The vehicle remote control method according to claim 15, wherein in the state determination step, the region information of the region where maintenance is permitted and the position information of the vehicle are acquired, and if the vehicle is not located in the region, it is determined that the vehicle is not in the maintenance state, and in the warning step, the warning for notifying the abnormality of the vehicle is transmitted to the server based on the determination of the state determination step.

19. The vehicle remote control method according to claim 15, further comprising a setting step of setting the region where maintenance is permitted, wherein in the setting step, based on position information of a designated base of maintenance, an area within a predetermined range is set as the region where maintenance is permitted.

20. The vehicle remote control method according to claim 14, further comprising a state determination step of determining, based on presence/absence of an operation input from an operation unit configured to set the state of the vehicle to the maintenance state, whether the vehicle is in the maintenance state, wherein in the state determination step, the presence/absence of the operation input from the operation unit configured to set the state of the vehicle to the maintenance state is determined, and if the operation input is present, it is determined that the vehicle is in the maintenance state, and in the processing suppression step, the processing of the warning step is suppressed until a predetermined time elapses from the operation input based on the determination of the state determination step.

21. The vehicle remote control method according to claim 20, wherein in the processing suppression step, if an operation from an extension operation unit configured to set extension of the predetermined time is input, a default extended time to extend the predetermined time is set, and the processing of the warning step is suppressed until the extended time elapses.

22. The vehicle remote control method according to claim 20, further comprising an extended time setting step of setting, as the extended time, a time obtained by adding an extra time to the extended time input by the user operation, wherein in the processing suppression step, the processing of the warning step is suppressed until the extended time set in the extended time setting step elapses.

23. The vehicle remote control method according to claim 20, wherein in the state determination step, the number of times of operation inputs from the operation unit during a predetermined period is counted, and in the warning step, if the number of times of operation inputs exceeds a count limit serving as a reference, the warning for notifying the abnormality of the vehicle is transmitted to the server.

24. The vehicle remote control method according to claim 20, wherein in the warning step, if the voltage information acquired from the power supply device after the elapse of the predetermined time is not more than a voltage value serving as a reference, the warning is transmitted to the server.

25. The vehicle remote control method according to claim 20, wherein identification information is further acquired from the power supply device after the elapse of the predetermined time, and in the warning step, if the acquired identification information is different from authentic identification information, the warning is transmitted to the server.

26. A server configured to remote-control a vehicle via a communication device including a warning unit configured to, if voltage information cannot be acquired from a power supply device configured to supply power, transmit a warning for notifying an abnormality, and a processing suppression unit configured to, if the vehicle is in a maintenance state, suppress processing of the warning unit such that the warning is not transmitted, the server comprising:

a reception unit configured to receive the warning for notifying the abnormality of the vehicle;

a generation unit configured to generate a control signal for remote-controlling the vehicle based on the warning received by the reception unit; and a transmission unit configured to transmit the control signal generated by the generation unit to the communication device.

27. A terminal device configured to, if voltage information cannot be acquired from a power supply device configured to supply power, set a vehicle in a maintenance state to suppress transmission of a warning for notifying an abnormality of the vehicle, the terminal device comprising:
    an operation unit configured to set a state of the vehicle to the maintenance state during a time until a predetermined time elapses;
    an extension operation unit configured to extend the time until the predetermined time elapses; and
    an extended time setting unit configured to set an extended time to extend the time based on a time input by a user operation.

28. The terminal device according to claim 27, wherein the extended time setting unit sets, as the extended time, a time obtained by adding an extra time to the extended time input by the user operation.

29. A communication device comprising:
    an acquisition unit configured to acquire control information representing a control state of a vehicle from a control device configured to control the vehicle and voltage information from a power supply device configured to supply power to the vehicle;
    a transmission unit configured to transmit the control information and the voltage information to a server;
    a warning unit configured to, if the voltage information cannot be acquired, transmit a warning for notifying an abnormality of the vehicle to the server; and
    a processing suppression unit configured to, if the vehicle is in a maintenance state, suppress processing of the warning unit such that the warning is not transmitted.

30. The communication device according to claim 29, further comprising a state determination unit configured to determine, based on position information of the vehicle, whether the vehicle is in the maintenance state,
    wherein the state determination unit acquires region information of a region where maintenance is permitted and the position information of the vehicle, and if the vehicle is located in the region, and the control information can be acquired, determines that the vehicle is in the maintenance state, and
    the processing suppression unit suppresses the processing of the warning unit based on the determination of the state determination unit.

31. The communication device according to claim 30, wherein if the voltage information acquired from the power supply device after an end of the maintenance is not more than a voltage value serving as a reference, the warning unit transmits the warning to the server even if the vehicle is located in the region.

32. The communication device according to claim 30, wherein the state determination unit further acquires identification information from the power supply device after the end of the maintenance, and
    if the acquired identification information is different from authentic identification information, the warning unit transmits the warning to the server even if the vehicle is located in the region.

33. The communication device according to claim 30, wherein
    the state determination unit acquires the region information of the region where maintenance is permitted and the position information of the vehicle, and if the vehicle is not located in the region, determines that the vehicle is not in the maintenance state, and
    the warning unit transmits the warning for notifying the abnormality of the vehicle to the server based on the determination of the state determination unit.

34. The communication device according to claim 30, further comprising a geofence setting unit configured to set the region where maintenance is permitted,
    wherein based on position information of a designated base of maintenance, the geofence setting unit sets an area within a predetermined range as the region where maintenance is permitted.

35. The communication device according to claim 29, further comprising a state determination unit configured to determine, based on presence/absence of an operation input from an operation unit configured to set the state of the vehicle to the maintenance state, whether the vehicle is in the maintenance state,
    wherein the state determination unit determines the presence/absence of the operation input from the operation unit configured to set the state of the vehicle to the maintenance state, and if the operation input is present, the state determination unit determines that the vehicle is in the maintenance state, and
    the processing suppression unit suppresses the processing of the warning unit until a predetermined time elapses from the operation input based on the determination of the state determination unit.

36. The communication device according to claim 35, wherein if an operation from an extension operation unit configured to set extension of the predetermined time is input, the processing suppression unit sets a default extended time to extend the predetermined time, and suppresses the processing of the warning unit until the extended time elapses.

37. The communication device according to claim 35, wherein
    if the set extended time is input from an extended time setting unit configured to set, as the extended time, a time obtained by adding an extra time to an extended time input by a user operation,
    the processing suppression unit suppresses the processing of the warning unit until the extended time set by the extended time setting unit elapses.

38. The communication device according to claim 35, wherein
    the state determination unit counts the number of times of operation inputs from the operation unit during a predetermined period, and
    if the number of times of operation inputs exceeds a count limit serving as a reference, the warning unit transmits the warning for notifying the abnormality of the vehicle to the server.

39. The communication device according to claim 35, wherein if the voltage information acquired from the power supply device after the elapse of the predetermined time is not more than a voltage value serving as a reference, the warning unit transmits the warning to the server.

40. The communication device according to claim 35, wherein
    the state determination unit further acquires identification information from the power supply device after the elapse of the predetermined time, and
    if the acquired identification information is different from authentic identification information, the warning unit transmits the warning to the server.

\* \* \* \* \*